United States Patent [19]

Watanabe

[11] Patent Number: 4,626,924
[45] Date of Patent: Dec. 2, 1986

[54] IMAGE FORMING APPARATUS
[75] Inventor: Junji Watanabe, Yokohama, Japan
[73] Assignee: Kabushiki Kaisha Toshiba, Kawasaki, Japan
[21] Appl. No.: 660,071
[22] Filed: Oct. 12, 1984
[30] Foreign Application Priority Data
Oct. 14, 1983 [JP] Japan ................ 58-191921
[51] Int. Cl.$^4$ .............................. H04N 1/04
[52] U.S. Cl. .................... 358/285; 358/293; 358/296; 355/14 SH
[58] Field of Search ............ 358/285, 293, 296; 355/3 R, 14 SH, 14 CU

[56] References Cited
U.S. PATENT DOCUMENTS

| 4,424,535 | 1/1984 | Rothbart | 358/293 |
| 4,439,790 | 3/1984 | Yoshida | 358/293 |
| 4,506,302 | 3/1985 | Kurata | 358/293 |

Primary Examiner—James J. Groody
Assistant Examiner—Edward L. Coles
Attorney, Agent, or Firm—Cushman, Darby & Cushman

[57] ABSTRACT

An image forming apparatus for forming an image on papers in response to the image information of an original on an original table is provided with a reading unit for scanning the original, and also with x- and y-direction moving mechanisms for moving the reading unit two-dimensionally at the time of scanning operation. The x- and y-direction moving mechanisms are provided with first and second carriages for holding and moving the reading unit in x- and y-directions. X- and y-direction display lines are put down on the first and second carriages, respectively. When the first and second carriages are moved, therefore, their display lines display on the original table an image forming area which the reading unit can read.

15 Claims, 18 Drawing Figures

IMAGE FORMING APPARATUS

BACKGROUND OF THE INVENTION

The present invention relates to an image forming apparatus for forming images from image information of originals placed on the original table and, more particularly, to an image forming apparatus wherein a reading unit to read the image information is moved relative to the original table.

This type apparatus, for example, a copying machine is provided with the original table fixed to the machine body and an exposing unit arranged to reciprocate along the plane of this original table. Copying is done in such a way that the exposing unit which includes an exposing lamp, mirror and the like is reciprocated along the fixed original table to expose and scan the originals on the original table. Since the originals to be copied have various sizes such as A4 and B5, sheets of paper on which images are to be formed are grouped according to these original sizes and are previously set in the copying machine.

However, it happens sometimes that an original of A4 size, for example, is copied on sheets of B5 size, for example, because the size of these sheets which have been previously set in the copying machine is not recognized, or that the original is set, long side up, on the original table in spite of setting it short side up, even when the original and sheets are the same (A5 size, for example) in size. In the case of the conventional apparatus, therefore, the area where copying can be made cannot be known in the stage of setting the original on the original table, thereby causing incomplete image formation (or copying). Particularly when the original is not of standard size, the above-mentioned copying mistakes are liable to be caused.

SUMMARY OF THE INVENTION

The object of the present invention is to provide an image forming apparatus wherein an error can be prevented by displaying on the original table the image formable area which corresponds to any of sizes of sheets on which images are to be formed.

According to the present invention, there is provided an image forming apparatus for forming images on recording materials in response to image information of originals set on an original table comprising a reading means two-dimensionally moved along the original table, on which the original is set, to read image information of the original and generate an image information signal; a first means for moving the reading means in a first direction; a second means for moving the reading means in a second direction intersecting with the first direction, said second moving means cooperating with the first moving means to move the reading means along the original; a means for forming an image on the recording material in response to the image information signal applied from the reading means; a means for detecting the size of the recording material on which the image is to be formed and generating a detection signal; and means for displaying on the original table the area which the reading means can read, in response to the detection signal, said display means being arranged at the first and second moving means, respectively.

DETAILED DESCRIPTION OF THE PREFERRED EMBODIMENT

An embodiment of the present invention will be described in detail referring to FIGS. 1 through 18.

Figure 1:
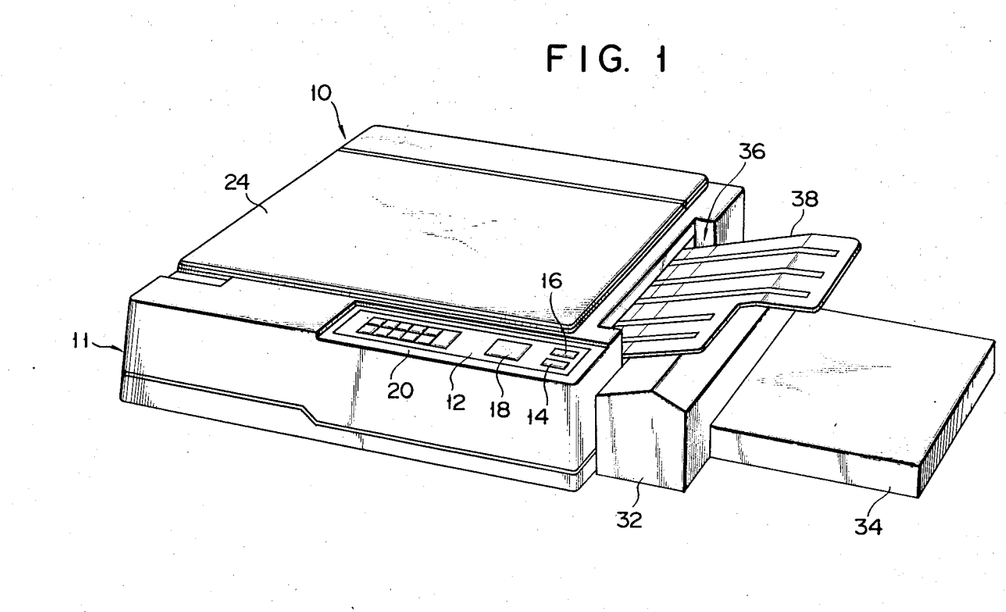
FIG. 1 is a perspective view showing the copying (or image forming) apparatus according to an embodiment of the present invention.
Figure 2:
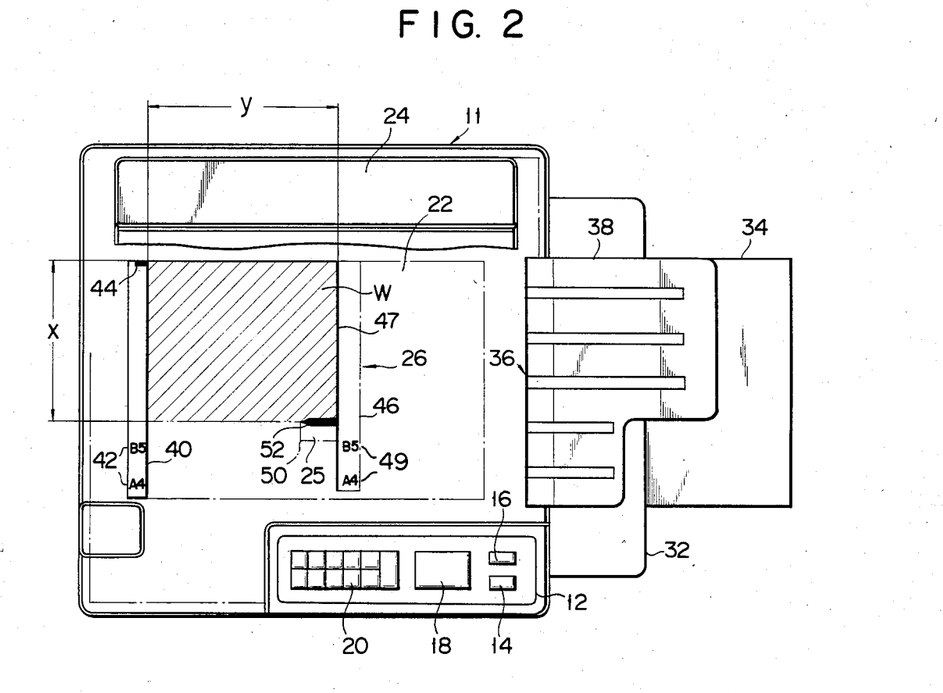
FIG. 2 is a plan showing the copying apparatus of FIG. 1 partially sectioned.
Figure 3:
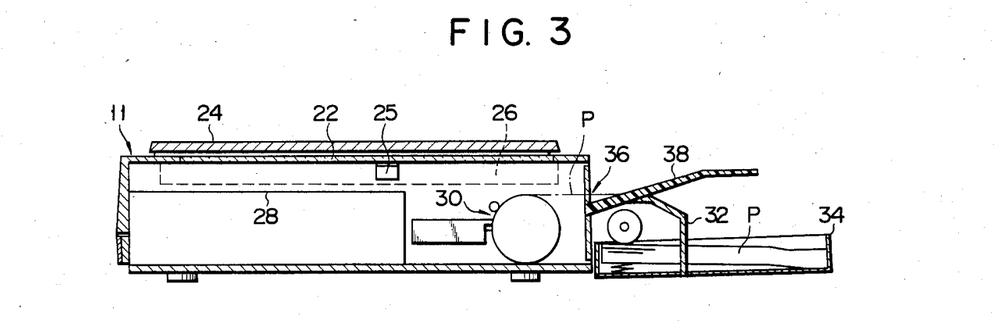
FIG. 3 is a sectional view showing the copying apparatus in FIG. 1.

As shown in FIGS. 1 and 2, a copying (or image forming) apparatus 10 which is the embodiment of the present invention is provided with an operation panel 12 arranged at the front upper face of a body 11. A start key 14, display 16 for displaying the number of sheets of paper on which an original is to be copied, another display 18 for displaying the state of copying operation, and ten keys 20 are arranged at the operation panel 12. An original table 22 made of transparent glass plate is arranged in the center of the upper face of the body 11, and originals to be copied are set on the original table 22. A cover 24 is freely opened and closed on the upper face of the body 11 to cover the original table 22. As shown in FIG. 2, a scanning unit 26 which scans the original on the original table 22 is arranged inside the body 11 under the original table 22. As will be described later in detail, the scanning unit 26 is provided with a reading unit (or reading means) 25 for reading image information of the originals and generating signals according to the image information, X-direction and Y-direction mechanisms (or first and second means) 27 and 29 for two-dimentionally moving the reading unit 25, and a display mechanism (or display means) 31 for displaying an image forming area. As shown in FIG. 3, an image forming unit 30 for forming images on sheets (or recording materials) P responsive to the image information signals applied from the reading unit 25 is arranged inside the body 11.

A paper supply unit 32 which supplies sheets of paper to the image forming section 30 is located outside the body 11, corresponding to the image forming section 30, and a paper supply cassette 34 is freely detachable from the paper supply unit 32. Various kinds of cassettes 34 are prepared to contain sheets of various sizes. Paper discharge opening 36 is formed in that outer face of the body which is above the paper supply unit 32, and a paper receiving tray 38 is detachably attached to the paper discharge opening 36, through which copied sheets are discharged.

As shown in FIGS. 2 and 3, that area of the original table 22 on which the originals are placed is rectangular, and a scale 40 is secured to the upper face of the body 11 along one side of the original table 22. The scale 40 projects a little from the original table 22, so that one side of the original can contact the scale 40 and can be positioned at right place. Symbols 42 such as B5 and A4, which show the positions of originals of various sizes to be placed on the table 22, are drawn on the fixed scale 40. The scale 40 also has a mark 44 which shows an edge of the original, continuous from that edge or side of the original placed on the original table 22 which contacts the scale 40. Since the original table 22 is made of transparent glass, as described above, the operator can see the scanning unit 26 arranged under the original table 22. Attached to the scanning unit 26 is a moving scale (or display means) 46 which is arranged on the Y-direction mechanism 29 and which moves together with the reading unit 25 in the direction y. This scale 46 is painted black, with a yellow display line (or y-direction display line) 47 extending along the longitudinal side thereof. The yellow line and the longitudinal side of the secured scale 40 display the image forming area (or scanning area of the reading unit 25) in the direction y. Symbols 49, "B5" and "A4", are marked on the scale 46 at the positions corresponding to the symbols "B5" and "A4" of the scale 40.

Further, a display member 50 which can move in the direction x is arranged at the reading unit 25. A yellow line 52 extending in the direction x is drawn on the display member 50, thus defining the image forming area. The image forming area W is defined by the mark 44 and x-direction display line 52. Since the display lines 47 and 52 which define the image forming area are displayed on the original table 22, the operator can easily recognize the image forming area W. This area W changes depending on the sizes of papers on which images are to be copied. More specifically, the starting position of the reading unit 25 is determined by the size of the sheets. A mechanism for determining this starting position will be described later.

The scanning unit 26 which scans the original by two-dimensionally moving the reading unit 25 along the original will be described in detail referring to FIGS. 4 through 8.

Arranged at the reading unit 26 is a first carriage 60 which holds a light source 54 (FIG. 8) for exposing the original on the original table 22, a lens (or focussing light transmission body) 56 for receiving the light emitted from the light source 54 and reflected by the original, and an image sensor 58 for converting the light passing through the lens 56 into an electric signal. The first carriage 60 is included in the X-direction mechanism 27 and arranged to freely move along a first pair of guide rails 62 and 64. The guide rails 62 and 64 extend parallel to each other and in the direction x to guide the first carriage 60 in the direction x. CCD or a-Si sensor, for example, is used as the image sensor 58. Photoelectric conversion elements are arranged in the direction y at the image sensor 58 to produce multi bit data.

Figure 9:
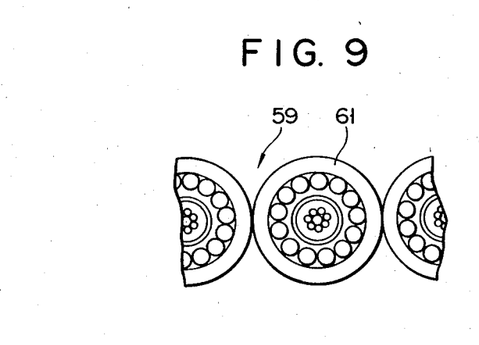
FIG. 9 is a sectional view a signal transmitting cable in FIG. 6.

Connected to the image sensor 58 is a signal transmitting cable 59 which is U-shaped in a second carriage 66 for moving the reading unit 25 in the direction y. The signal transmitting cable 59 is flexible. Its one side extends along the guide rail 62, while its other side extends along the other first guide rail 64. One end of the signal transmitting cable 59 is connected to the above-described image forming unit 30 to supply image information signals from the image sensor 58 to the image forming unit 30. As shown in FIG. 9, the signal transmitting cable 59 is made of a bundle of conductive lines 61. These conductive lines 61 include a center conductor which comprises twisting a plurality of lines each having a diameter smaller than 0.1 mm.

The guide rails 62 and 64 form the second carriage 66 which is substantially rectangular. Attached to each end of the second carriage 66 is a wheel 72 capable of rotating on a second guide rail 68, and a slide member 74 slidable on another second guide rail 70. The second carriage 66 is included in the Y-direction mechanism 29. A second pair of guide rails 68 and 79 extend substantially parallel to each other in the direction y. This construction of the scanning unit 26 enables the first carriage 60 to freely move in the direction x while the second carriage 66 in the direction y. Further, the first carriage 60 is connected to a timing belt 76 which extends along the guide rail 64, and it is reciprocated in the direction x by driving the timing belt 76. This timing belt 76 is stretched between a first driving pulley 78, which is driven by a first pulse motor 82, and a follower pulley 80. The first carriage 60 is reciprocated in the direction x as the first pulse motor 82 rotates, thus driving the timing belt 76. The second carriage 66 is mounted on the guide rails 68 and 70. Its ends are connected to a pair of wires 84 and 86. One end portions of these wires 84 and 86 are wound around reels 90 and 92 fixed to a shaft 88, while the other ends are pulled by springs (not shown).

One end of the shaft 88 is connected to a second pulse motor 93 by a speed reduction mechanism 94. The second pulse motor 93 rotates the shaft 88. Since the second carriage 66 is moved in the direction y as the second pulse motor 93 rotates, thus driving the wires 84 and 86, the first carriage 60 is also reciprocated together with the second carriage 66 in the direction y. On the other hand, the first carriage 60 is reciprocated in the direction x as the first pulse motor 82 rotates, thus driving the timing belt 76.

To scan the original, the image sensor 58 is moved more than one time (three times in this case) in the direction x, moving the first carriage 60 and bending the U-shaped signal transmitting cable 59, which is connected to the image sensor 58, in a plane parallel to the original table 22. The image sensor 58 is then moved in the direction y only by a distance equals to the width of the image sensor 58, moving the second carriage 66. The first and second carriages 60 and 66 are repeatedly moved, thereby scanning the entire image forming area W.

Figure 10:
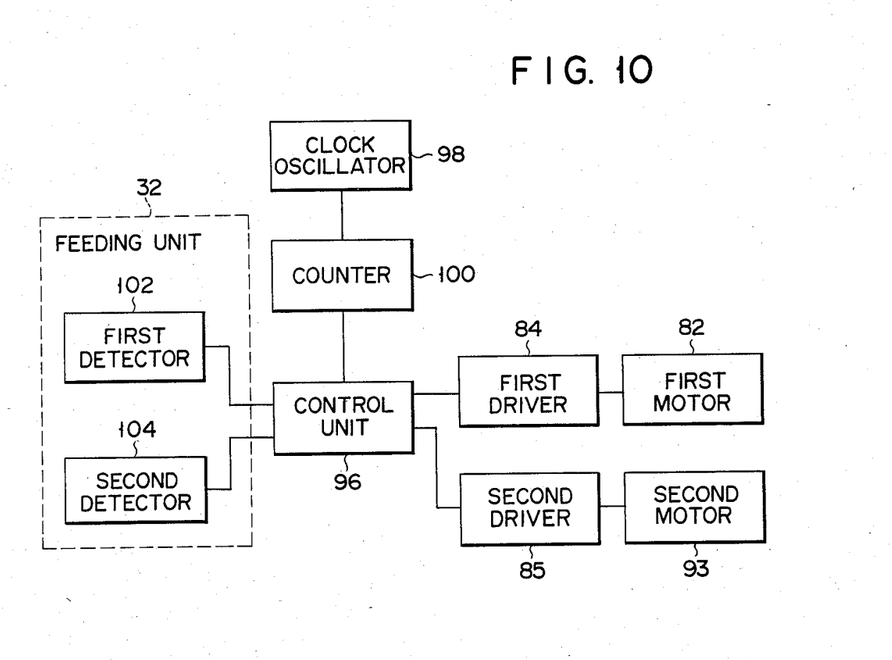
FIG. 10 is a block diagram explaining the control of pulse motors shown in FIG. 4.
Figure 11:
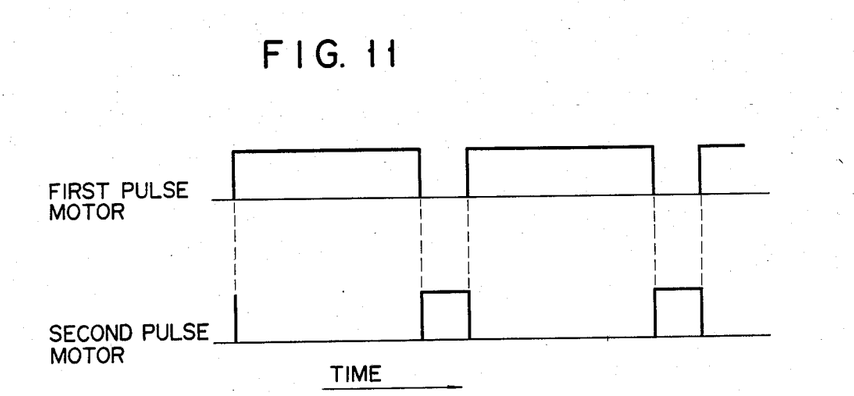
FIG. 11 is a timing chart explaining the operation of the pulse motors.
Figure 12:
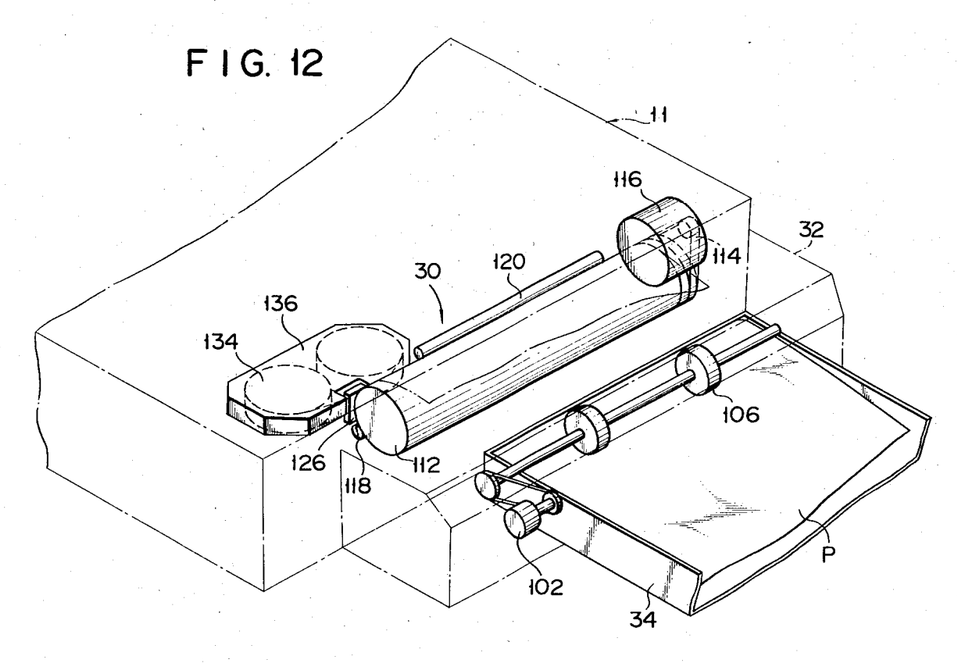
FIG. 12 is a perspective view showing an image forming unit of the copying apparatus shown in FIG. 1.

A control mechanism for controlling the image sensor 58 or reading unit 25 to scan the entire image forming area W will be described referring to FIGS. 10 and 11.

First and second pulse motors 82 and 93 are connected to a control unit 96 by first and second drivers 84 and 85. The first driver 84 drives the first pulse motor 82 in response to a drive signal (or pulse signal) applied from the control unit 96. The second driver 85 drives the second pulse motor 93. A control unit 96 is connected to a counter 100, which is connected to a clock oscillator 98. The clock oscillator 98 generates signals to control an electronic clock, and said counter 100 counts the signals generated by the clock oscillator 98. The control unit 96 processes signals from the counter 100 and applies drive signals to the first and second drivers 84 and 85.

The control unit 96 is connected to first and second size detectors 102 and 104 which detect the size of papers set in the paper supply section 32. In response to detection signals applied from the size detector 102 or 104, the control unit 96 drives the first and second pulse motors 82 and 93 to define the image forming area W and determine the initial position of the reading unit 25. This operation will be described later in detail.

The control unit 96 causes the first and second pulse motors 82 and 93 to be driven by the signals applied from the clock oscillator 98 and counter 100 at the time of scanning operation. In this case, the drive signal is applied to the first pulse motor 82 to move the first carriage 60 in the direction x, and is applied to the second pulse motor 93 to move the second carriage 66 in the direction y only by a distance which corresponds to the width of the lens 56, as shown in FIG. 11. The image forming area W can be scanned by alternately driving the first and second pulse motors 82 and 93 as described above.

The paper supply unit 32 for supplying the sheets P to the image forming section 30 provided in the body 11. This section 30 for forms images on the sheets P in response to image information signals applied from the reading unit. The section 30 will be described, referring to FIGS. 12 and 13.

Arranged inside the paper supply unit 32 are paper supply rollers 106 for feeding the sheets P from the paper supply cassette 34 to the image forming unit 30 through a paper supply opening 105. The rollers 106 are driven by a motor 102 arranged in the paper supply unit 32. The sheet P fed by the paper supply rollers 106 is conveyed by a pair of rollers 108 and 110 (FIG. 13) to a platen roller 112. As shown in FIG. 10, the size detectors 102 and 104 are arranged at the paper supply unit 32. These detectors 102 and 104 detect the sizes of the sheets P by detecting the paper supply cassette 34, because the cassettes 34 are distinguished by the sizes of the sheets P they contain. Different numbers of projections are formed on various kinds of cassettes in this case, and this number of projections is detected to distinguish one paper supply cassette 34 from another. Needless to say, the detectors 102 and 104 may detect the size of the sheets P in other ways. For instance, bar codes may be attached to the paper supply cassettes 34 and read by the detectors 102 and 104.

Figure 13:
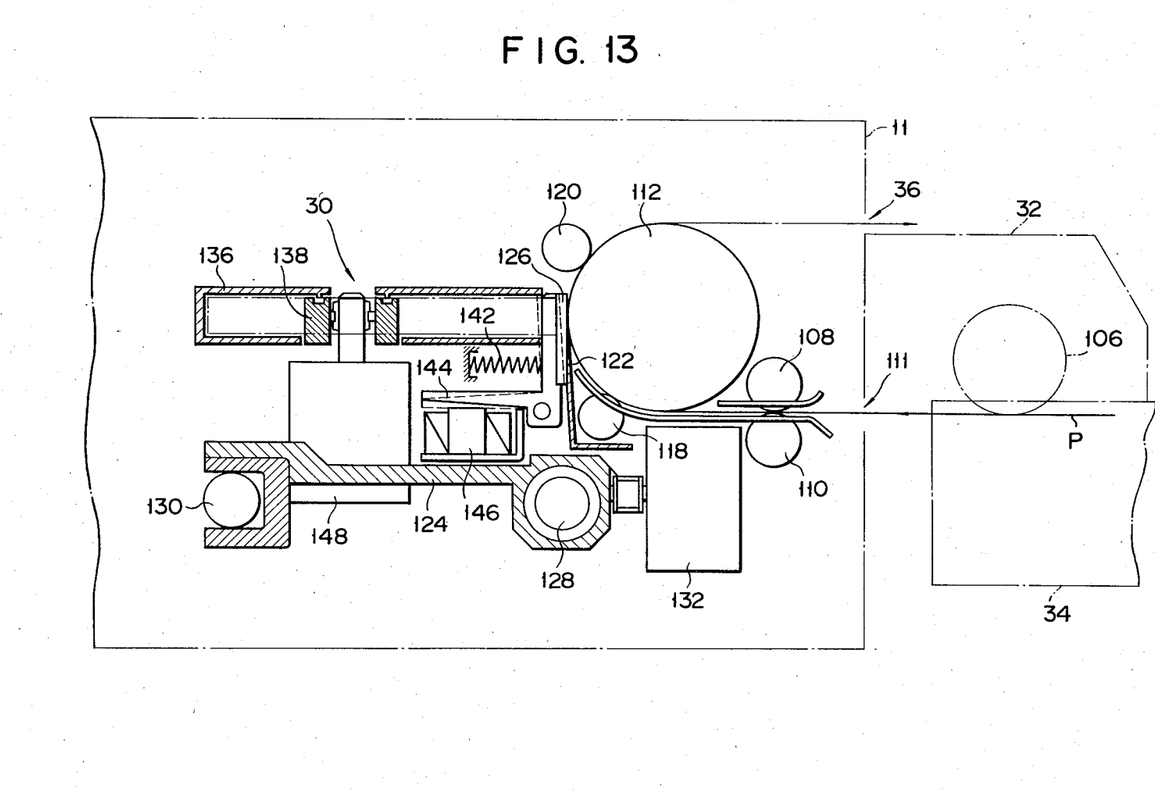
FIG. 13 is a side view, partially sectioned, showing the main portion of the image forming unit in FIG. 12.

The image forming unit 30 includes a platen 112 which is located substantially parallel to the short sides of the sheets P. The platen 112 is connected to a pulse motor 116 by a timing belt 114. A pair of press rollers 118 and 120 are arranged, remote from each other, to hold the sheet P on the platen 112. A paper holder 122 is located between the press rollers 118 and 120 to prevent the sheets P from moving off the platen 112. This paper holder 122 has an L-shaped cross-section, as shown in FIG. 13. A head carriage 124 is arranged between the press rollers 118 and 120 to face the side of the platen 112. A thermal print head 126 is held on the head carriage 124 to print an image in response to image information applied from the reading unit 25. The head carriage 124 is slidable along rails 128 and 130 extending substantially parallel to the longitudinal axis of the platen 112. The carriage 124 is connected to a third pulse motor 132 by a timing belt (not shown). It moves back and forth along the platen 112 and along the side of the platen 112 as the third pulse motor 132 rotates. An ink ribbon (or ink film) 134 is interposed between the heat sensitive head 126 and the platen 112. The ribbon 134 is contained in a ribbon cassette 136 which is detachably attached to the head carriage 124. The ribbon 134 is moved in parallel to and along the platen 112.

Figure 14:
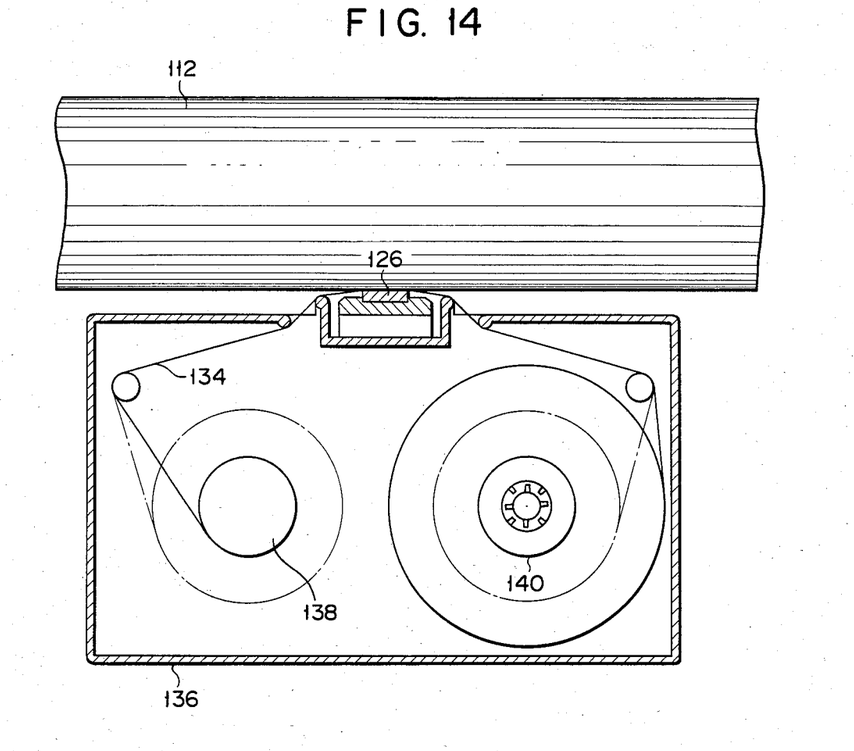
FIG. 14 is a sectional view showing a transferring section of the image forming unit in FIG. 12.

A pair of cores 138 and 140 around which both end portions of the ribbon 134 are wound are held rotatable and remote from each other in the ribbon cassette 136, as shown in FIG. 14.

A spring 142 is arranged to move the head carriage 124 to cause the head 126 to press the ribbon 134 onto the sheet P wrapped around the platen 112. The spring 142 urges the thermal print head 126 from its back side with a certain pressure. As shown in FIG. 13, the head 126 is supported by a part of an L-shaped support member 144, which is rotatable about its center. An electromagnet 146 is arranged at the remaining portion of the support member 144. When the magnet 146 is energized, the support member 144 is rotated against the force of the spring 142, whereby the head 126 is separated from the platen 112.

Further, a motor 148 engageable with one 138 of the ribbon-wound cores is arranged, at the head carriage 124 to wind the ribbon 134 round the cores 138 and 140.

Figure 15:
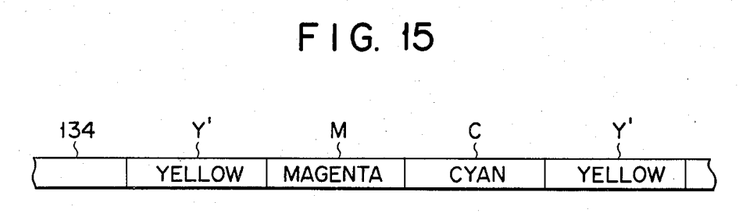
FIGS. 15 and 16 are plan views showing ribbons to be set in a cassette in FIG. 14.
Figure 16:
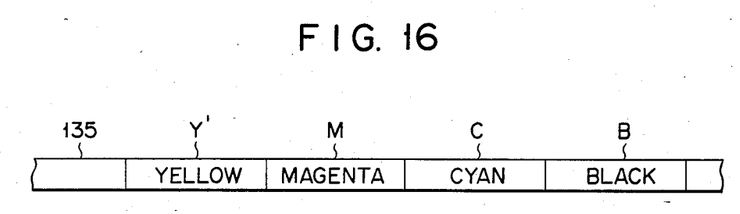

As shown in FIG. 15, the ribbon 134 has yellow Y', magenta M and cyan C portions successively arranged in this order. A ribbon 135 having yellow Y', magenta M, cyan C and black B portions as shown in FIG. 16 may be employed.

It will be described how an image is formed by the image forming unit 30 when the ink ribbon 134 shown in FIG. 15 is used.

Figure 17:
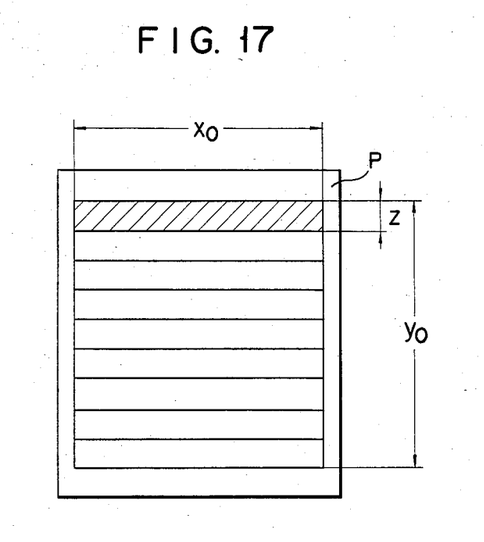
FIG. 17 is a view explaining the transferring operation of the image forming unit.

The color yellow Y' portion is set in relation to the heat sensitive head 126 and the head carriage 124 is moved in a traverse direction Xo of the sheet P shown in FIG. 17. The head carriage 124 is then returned to its initial position. The color magenta M portion is set relative to the heat sensitive head 126 and the head carriage 124 is moved in the direction Xo of the sheet P to perform printing. The head carriage 124 is then returned to its initial position. Further, the color cyan C portion is set and same operation is carried out. That portion of the sheet P which corresponds to the width Z (FIG. 17) of the thermal print head has images transferred by the above-described process. After the printing (or transferring) at the area Z is finished, the platen roller 112 is driven to move the sheet P in a direction Yo only by the width Z, and the above-described transferring process of three colors is repeated. When this process is repeated N times, $$Yo = N \cdot Z$$

Therefore, printing can be made in an area of $Xo \times Yo$.

Figure 18:
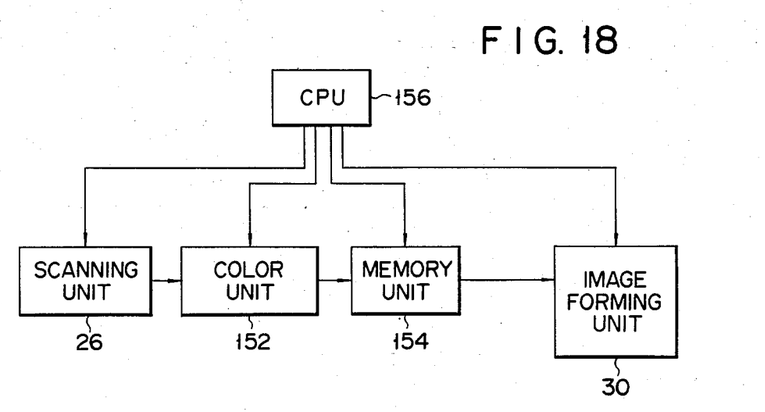
FIG. 18 is a block diagram showing a control circuit for the image forming unit.

A system for controlling the image forming unit 30 will be described in reference to FIG. 18.

A color-selecting unit 152 and a memory unit 154 are interposed between the scanning unit 26 and the image forming unit 30. The color-selecting unit 152 is connected to the scanning unit 26 and selects the color portion, i.e., magenta, yellow or cyan portion of the ribbon in response to color component signals or green, yellow, cyan and black signals detected by the scanning unit 26. Connected to the color-selecting unit 152 is memory unit 154 storing position data on the original association with the respective collors. The memory unit 154 is connected to the image forming unit (or heat transferring unit) 30 which transfers ink of each color to the sheet P in response to the information of colors and their positions read from the memory unit 154, thereby printing the image.

The scanning unit 26, color-selecting unit 152, memory unit 154 and heat transferring unit 30 are connected to a CPU (or central processing unit) 156, which controls the signal generating time and operation of each of these units. The scanning unit scans one line three times. When the ribbon shown in FIG. 16 is used, transferring operation is repeated four times by the image forming unit. The black ink is transferred in response to a composite signal consisting of yellow magenta and cyan signals.

Figure 4:
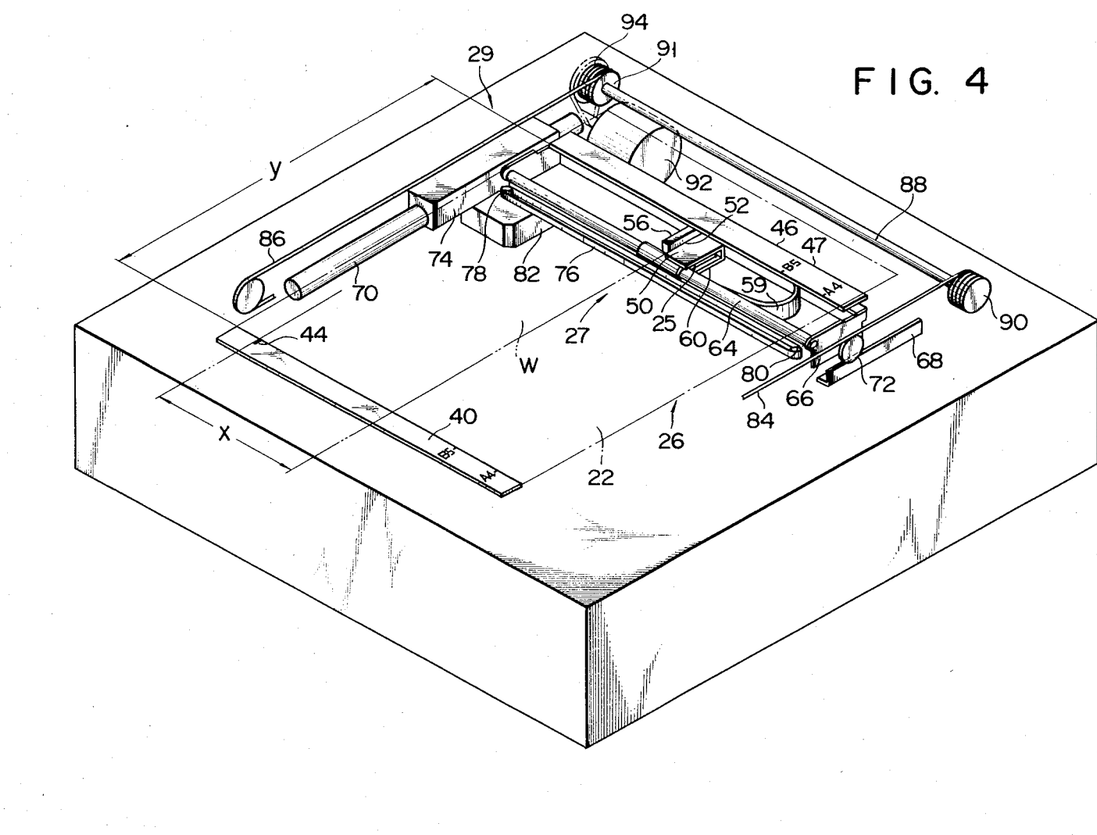
FIG. 4 is a perspective view showing a scanning unit and a display unit employed by the copying apparatus in FIG. 1.
Figure 5:
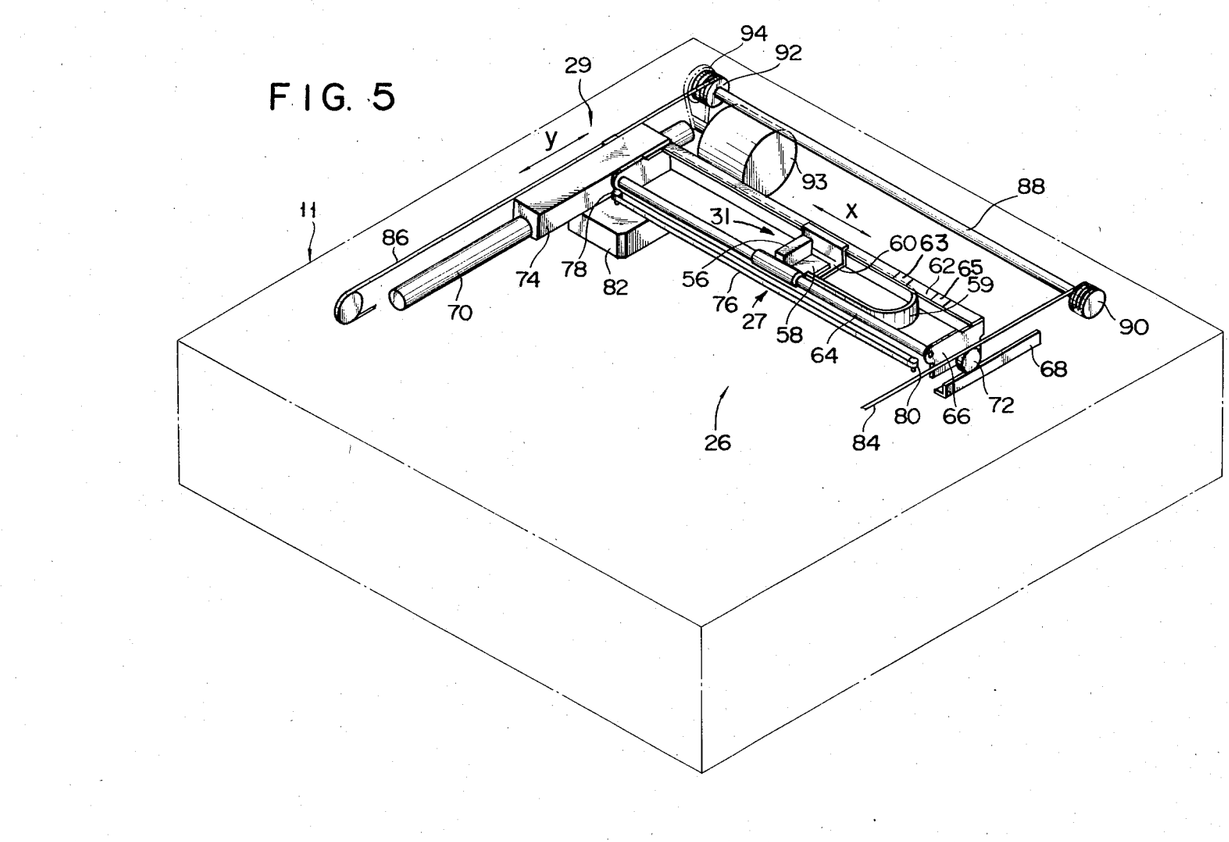
FIG. 5 is a perspective view showing only the scanning unit in FIG. 4.
Figure 6:
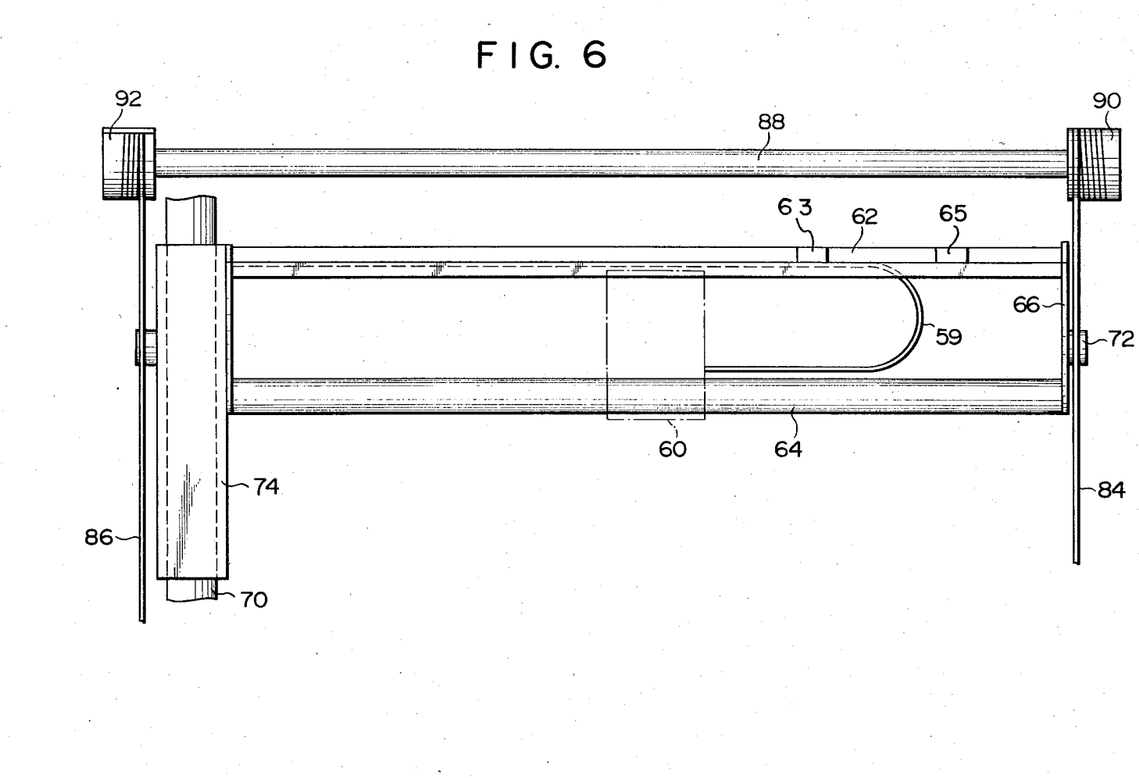
FIG. 6 is a plan view partially showing a mechanism for moving in directions x and y and employed by the scanning unit in FIG. 4.
Figure 7:
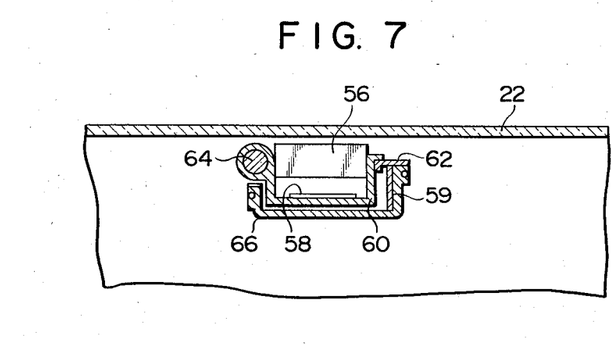
FIG. 7 is a sectional view showing the mechanism for moving in the direction x.
Figure 8:
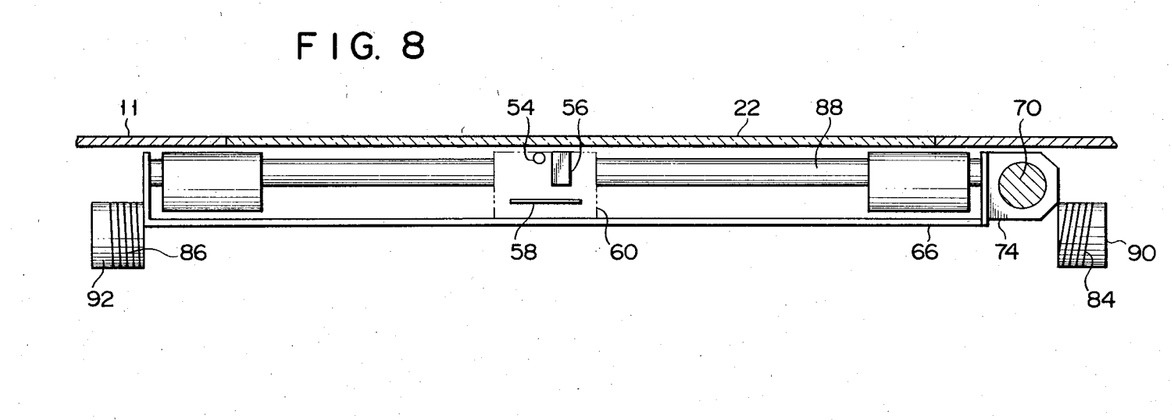
FIG. 8 is a front view showing the mechanism for moving in the direction x.

On the other hand, the image forming area W is displayed by the start position of the reading unit 25 which moves together with the first and second carriages 60 and 66. Namely, before the reading unit 25 scans an original or when the original is placed on the original table 22, the reading unit 25 is set at a scan starting position according to the size of paper. A mechanism for determining this start position will be described below. When one of the size detectors (or micro-switch) 102 which detects the paper supply cassette 34 for A4-sized sheets, for example, and of the size detector 104 which detects the paper supply cassette 34 for B5-sized sheets is operated at the paper supply unit 32 as shown in FIG. 10, its output signal is supplied to the control unit 96, which determines the kind of sheets set. Pulses are supplied from the control unit 96 to the first and second pulse motors 82 and 93, respectively, through the first and second drivers 84 and 85 to thereby drive these pulse motors 82 and 93. The first and second carriages 60 and 66 are thus driven in the directions x and y (FIGS. 2 and 4) to determine the initial position of the reading unit 25. More specifically, a detector, for example, micro-switches 63 and 65, are arranged at the predetermined position (or initial position) in the directions y and x in which the first and second carriages 60 and 66 are moved. When the micro-switches are operated, it is detected that the first and second carriages 60 and 66 have moved to the initial position. Pulses are suppled from the control unit 96 to the pulse motors 82 and 93 through the drivers 84 and 85 to move the first and second carriages 60 and 66 in the directions x and y, that is, to move the reading unit 25 from the initial position to a position which corresponds to the size of sheets detected. The moving distance of each of the first and second carriages 60 and 66 is controlled by comparing the number of pulses counted with a reference value which corresponds to a distance between the previously set initial position and the position specific to the predetermined size of sheets. The length of the original in the direction y is indicated by the position of y-direction display line on the moving scale 46. The length of the original in the direction x is indicated by the position of x-direction display line 52 on the reading unit 25, as shown in FIG. 4. The x-direction display line 52 points the symbols B5 and A4 on the moving scale 46 in this case.

The image forming area W is displayed when the supply in started and the paper supply cassette is set.

The scale 46 at the y-direction mechanism 27 and the reading unit 25 at the x-direction mechanism 29 are automatically set according to the size of sheets, causing their display lines 47 and 52 to define the image forming area W. Since these x- and y-direction display lines 47 and 52 can be seen through the original table 22, an original which is different in size from the papers set can be prevented from being copied and copying errors can be thus prevented beforehand.

The x- and y-direction display lines 47 and 52 are only painted on the first and second carriages 60 and 66 which assist original scanning, thereby displaying the image forming area W in a simple construction.

Further, the platen 112 of the image forming unit 30 is located adjacent to the inner side face of the body 11. Therefore, the paper supply and discharge openings can be formed in a same side of the body 11, so that the body 11 may be small-sized.

It should be understood that the present invention is not limited to the above-described embodiment but that various changes and modifications can be made without departing from the scope of the present invention.

The first and second carriages 60 and 66 may be moved depending upon the size of papers, enlargement and reduction copyings, for example. In this case, the well-known enlarging and reducing devices are provided, the state of key operation for setting the enlarging or reducing function and the size of papers set are discriminated, and the first and second carriages 60 and 66 are moved corresponding to the size of sheets and the desirable magnification. Even when arranged like this, same effects as those achieved by the above-described embodiment of the present invention can be attained.

The detector means for detecting the kind of the paper supply cassettes is not limited to the combination of projections and micro-switches. It may be arranged that magnets are embedded in the paper supply cassettes at different positions thereof and that reed switches are located corresponding to the magnets.

Although the sheets of paper have been automatically fed using the paper supply unit 32 and paper supply cassettes 34 in the case of the above-described embodiment, they may be instead into the paper supply opening by hands. In this case, an insertion guide is provided relative to the paper supply opening 111, and a paper guide for determining the position of papers in the width direction thereof is arranged at the insertion guide. This paper guide can be moved according to the width of papers, and the position of the moved paper guide can be detected by a detector such as a slide resistor or a potentiometer. Since the sheet is standardized to have a certain length-to-width ratio, it can be readily obtained when the width of paper is detected. The ratio is about 0.71. Therefore, the first carriage 60 is moved by a distance equal to the detected width V, while the second carriage 66 by a distance equal to a value (V/0.71). The size of sheets can be thus displayed through the original table 22 even when the sheets are inserted by hands.

Although one paper supply cassette has been set in the paper supply unit in the case of the above-described embodiment, two or more paper supply cassettes may be set. It may be arranged in this case that display buttons for displaying the kinds of cassettes set are provided on the panel and that the operator selectively pushes one of the buttons to detect the size of papers.

The image forming area has been displayed using the edges of the fixed original table, that is, the fixed scale and one side of the original table adjacent to the fixed scale, or positioning mark 44. In other words, the display means have displayed the image forming area at the corner portion of the original table. However, the image forming area may be displayed (or center-positioned) substantially at the center portion of the original table. A pair of display members which move relative to each other may be arranged at the first and second moving means in this case.

What is claimed is:

1. An image forming apparatus for forming images on recording materials in response to image information of originals set on an original table, comprising:
    a reading means having an initial position and being two-dimensionally moved along the original table, on which the original is set, to read image information of the original and generate an image information signal;
    detecting means for detecting the initial position of the reading means and outputting an initial position detection signal;
    a first means for moving the reading means in a direction;
    a second means for moving the reading means in another direction intersecting with the direction in which the reading means is moved by the first moving means, said second moving means cooperating with the first one to two-dimensionally move the reading means along the original;
    a means for forming an image on the recording material in response to the image information signal applied from the reading means;
    a means for detecting the size of the recording material on which the image is to be formed and generating a size detection signal; and
    a means for displaying on the original table the area which the reading means can read, in response to the size detection signal and the initial position detection signal, said display means being arranged at the first and second moving means, respectively.

2. An image forming apparatus according to claim 1, wherein said first moving means has a first carriage for holding and moving the reading means in a linear direction, and one of the display means is arranged on the first carriage.

3. An image forming apparatus according to claim 2, wherein the second moving means has a second carriage for holding and moving the first carriage in a direction perpendicular to the above-mentioned linear direction in which the reading means is moved, and the other of the display means is arranged on the second carriage.

4. An image forming apparatus according to claim 2, wherein the first carriage moves together with the reading means and is provided with a display member on which a display line is drawn.

5. An image forming apparatus according to claim 3, wherein the first carriage moves together with the reading means and is provided with a display member on which a display line is drawn.

6. An image forming apparatus according to claim 4, wherein the display line is yellow.

7. An image forming apparatus according to claim 3, wherein the second carriage is extended in the moving direction of the first carriage and provided with a display member on which a display line is drawn in the extending direction of the second carriage.

8. An image forming apparatus according to claim 7, wherein the display line is yellow.

9. An image forming apparatus according to claim 7, wherein symbols for representing the sizes of originals are put down on the display member and the display means on the first carriage points one of the symbols on the display member according to the size of original detected by the detector means.

10. An image forming apparatus according to claim 1, wherein the display means is fixedly located along one side of the original table and facing the first and second moving means, and it has a fixed scale on which the symbols denoting the sizes of originals are previously put down, and the fixed scale cooperates with the display means on the first and second moving means to display an image forming area.

11. An image forming apparatus according to claim 10, wherein the fixed scale is projected a little from the original table and one side of the original contacts the projected face of the fixed scale when the original is placed on the original table.

12. An image forming apparatus according to claim 1, further including a means for supplying the recording materials to the image forming means, wherein the detector means is arranged at the supply means to detect the size of recording materials set in the supply means.

13. An image forming apparatus according to claim 12, wherein the recording materials are contained in a cassette which corresponds to their size and the detector means detects the kind of these cassettes.

14. An image forming apparatus according to claim 13, wherein the detector means is provided with plural detector members each detecting one kind of cassette.

15. An image forming apparatus according to claim 1, wherein the first and second moving means move the display means to display the image forming area in response to the detection signal applied from the detector means, before they move the reading means two-dimensionally to read the image information of an original.

* * * * *